Oct. 6, 1964
C. E. TIRRELL
3,152,015
FUEL CELLS FOR THE PRODUCTION OF ELECTRICAL ENERGY
Filed Sept. 25, 1961
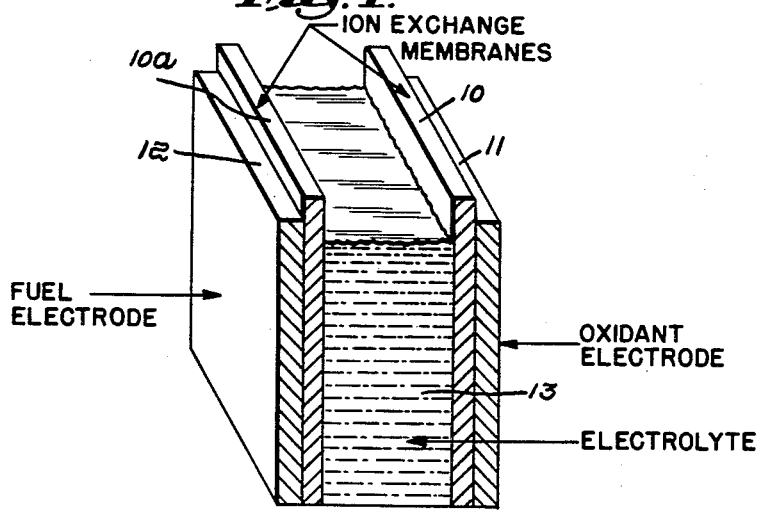
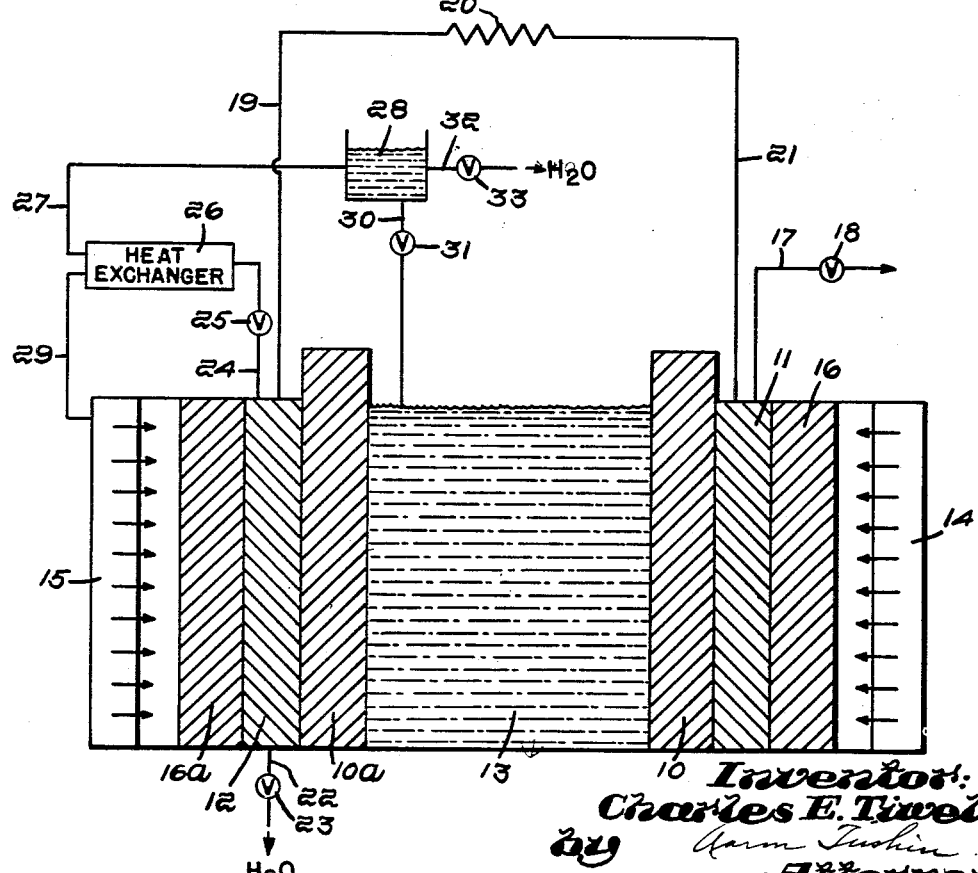
Inventor:
Charles E. Tirrell,
by Aaron Tushin
Attorney United States Patent Office 3,152,015
Patented Oct. 6, 1964

3,152,015
FUEL CELLS FOR THE PRODUCTION OF
ELECTRICAL ENERGY
Charles E. Tirrell, Nahant, Mass., assignor to Ionics Incorporated, Cambridge, Mass., a corporation of Massachusetts
Filed Sept. 25, 1961, Ser. No. 140,474
13 Claims. (Cl. 136—86)

This application relates to fuel cells and more particularly to novel fuel cells with ion-exchange membranes.

Fuel cells for the production of electrical energy from a gas or liquid containing a combustible component and an oxidizing gas (such as oxygen, air, a halogen, etc.), are well known in the art. Generally, a fuel cell may be defined as a device for directly converting the chemical energy of a fuel such as coal, coke, hydrogen, carbon monoxide, methane, etc. into electrical energy. In a typical fuel cell a combustible gas such as hydrogen is introduced into a cell through a porous electrode made, for example, of a noble metal or of porous carbon containing a noble metal catalyst or the like; and oxygen or an oxygen-containing gas is introduced through a second porous electrode containing perferably an active metal oxide catalyst, the two electrodes being electrolytically connected through either an aqueous electrolyte solution or a solid electrolyte, e.g. an ion-exchange membrane. In these cells, low voltage D.C. energy is produced directly from the reaction of hydrogen and oxygen (or the like) at conversion efficiencies considerably in excess of the usual conversion of chemical energy-to-heat-to-mechanical energy-to-electric-energy. Electrical energy which is produced over and above the demand at the time of production may be stored by converting the electrical energy directly into chemical energy. When the demand for electricity is greater than the generating capacity, this chemical energy can be converted back into electrical energy.

In recent times fuel cells have been widely studied as light-weight portable sources of electrical energy. As will be appreciated, such a device is particularly useful for military and space purposes where a ready source of electrical energy is not available.

Essentially the fuel cells heretofore known in the art consist, in their simplest form, of two catalyst-electrodes and a spacer therebetween. The electrodes, on which absorbed molecular gas is converted to atoms and then ionized, must be electron conductors. The spaced between the two electrodes is impermeable to gases and does not pass electrons, but does pass ions. In some fuel cells the spacer is an electrolyte solution in which porous electrodes are immersed. In such electrodes, problems arise due to the fact that the porous electrodes are brittle, expensive and hard to make. Moreover, some gas diffuses through the electrolyte and is lost.

Accordingly, efforts have been made to utilize ion-exchange membranes as spacers in fuel cells. These membranes are more impermeable to gases, and because they are solids, a wide variety of electrodes can be used and cell construction is particularly simple.

As will be appreciated by those skilled in the art, ion-exchange membranes are solid electrolytes in sheet form. The exchange materials are cross-linked polymers which have been rendered electrolytically conductive by the introduction of dissociable ionic groups chemically bonded to the polymer. Ion-exchange membranes also contain appreciable amounts of gel water which dissociate the active groups into a fixed ion attached to the macromolecular polymer and a mobile ion capable of carrying current within and across the membranes. For example, a sulfonated copolymer of styrene and divinylbenzene in the acid form will, when thoroughly leached in distilled water, conduct electricity solely by hydrogen ions moving across the membrane, since the sulfonate ion ($-SO_3^-$) is immobile as it is attached to the polymer. Similarly, a "leached" quaternary ammonium hydroxide membrane, for example, one which is obtained by chloromethylating a co-polymer of styrene and divinylbenzene and subsequently treating it with trimethylamine, conducts electricity solely by the hydroxyl ion.

In fuel cells membrane conductivity is of primary importance, whereas selectivity plays a secondary part. The conductivity of an ion-exchange membrane can be greatly enhanced by equilibrating it in a solution of a strong electrolyte. Such a membrane containing additional electrolyte can be used as a solid electrolyte by removing the membrane from the saturated electrolyte solution and utilizing it between two electrodes of a cell. The lower resistance of such a membrane permits improved discharge characteristics.

As was indicated earlier, it has been found desirable to utilize ion-exchange membranes in fuel cells. Not only do such membranes afford the advantages of being a separator of gases, of liquids, or of a gas from a liquid, but they also serve to keep the reactants apart and to permit relatively easy multiplication of fuel cells—a requirement for most applications. Moreover, thin membranes permit compact design of fuel cells, an important consideration in many military and space uses. Ion-exchange membranes also simplify many electrode problems, such as that of waterproofing, of uniform porosity (which is directly related to fuel utilization), and structural problems encountered with porous electrodes. Further advantages include the possibilities of obtaining non-spillable fuel cells and of removing water without contamination.

Such fuel cells utilizing ion-exchange membranes are known in the art. As an illustration of fuel cells containing ion-exchange membranes, mention may be made for example of U.S. Patent No. 2,913,511, issued on November 17, 1959, to W. T. Grubb; and the fuel cells disclosed and claimed in copending applications, Serial No. 842,892, filed September 28, 1959, now Patent 3,124,520, and Serial No. 29,617, filed May 16, 1960, both in the name of Walter Juda.

It has been found however, that certain problems arise when one seeks to utilize ion-exchange membranes in fuel cells. For example, if an ion-exchange membrane is used, either as a sole electrolyte or as a solid electrolyte saturated with an additional electrolyte, a lop-sided water transfer may occur which tends to dry one membrane face with respect to the other. This water transfer, which is inherently associated with the ion transport, results from two causes: (1) since all ions are more or less hydrated, water transport is inherent in the transfer of ions; and (2) since the membrane contains a fixed charge, endosmotic water transfers under the influence of an imposed D.C. potential across the membrane. The drying of the membrane due to water transfer causes an increase in electric resistance and a mechanical shrinkage with eventual cracking and permanent damage to the membrane which if course must be kept hydrated. Moreover, drying out or dehydration of the membrane may also be caused by air drying out the system faster than water is produced. The latter cause of dehydration is particularly a problem in systems utilizing air as the oxidant. In such a system, the cells are cooled by evaporation of the water which is formed in the cell into the passing air stream. This evaporation of the water formed in the cell does not provide enough cooling. Accordingly, the cell heats up and the air stream passing thorough the cell dehydrates the membranes.

Moreover, in systems utilizing ion-exchange membranes, further problems arise due to the tendency for the membranes to develop pin holes. Since one of the purposes of the membrane is to act as a spacer to prevent admixture between the gaseous fuel and the oxidant, these pin holes present a very real danger. For example, if hydrogen is used as the fuel and air as the oxidant, they will, with the slightest excitation, combine with explosive force. Thus, if a pin hole develops, there is the danger that the cell may catch fire and burn or explode.

It is to the aforementioned problems to which this invention relates.

It is therefore a primary object of this invention to provide a novel fuel cell.

Another object is to provide a fuel cell utilizing ion-exchange membranes, which is particularly useful for military and space purposes and which is both efficient and safe.

Still another object is to provide a novel fuel cell in which the problems resulting from dehydration of the membrane and/or development of pin holes is obviated.

Yet another object is to provide a dual membrane fuel cell comprising two ion-exchange membranes with a strong electrolyte solution between them.

Other objects will in part be obvious and will in part appear hereinafter.

For a fuller understanding of the nature and objects of the present invention, reference should be had to the following detailed disclosure taken in conjunction with the accompanying drawings wherein:

FIGURE 1 is a perspective view of a fuel cell of this invention; and

FIGURE 2 is a schematic view showing the operation of the cell described in FIGURE 1.

It has now been found, in accordance with the present invention, that the aforementioned difficulties may be obviated by providing a dual membrane fuel cell containing, as spacers, two ion-exchange membranes, one in intimate contact with the oxidant electrode and the other in intimate contact with the fuel electrode, the membranes being separated by a solution of electrolyte situated therebetween. The electrolyte solution situated between the membranes serves both to avoid the problem of drying out and to eliminate the dangers resulting from a gas leak in a membrane.

The invention will best be understood by referring to the accompanying drawing.

As shown in FIGURE 1, a fuel cell is provided comprising ion-exchange membranes 10 and 10a in contact with oxidant electrode 11 and fuel electrode 12 respectively. A compartment containing electrolyte 13 is situated between and in contact with membranes 10 and 10a.

The dual membrane fuel cell of this invention may be utilized with any of the oxidant-fuel combinations heretofore employed in fuel cells. Likewise, for purposes of this invention, it is immaterial whether the membranes employed are anion-exchange membranes or cation-exchange membranes and membranes 10 and 10a may be the same or different. The selection of the particular membranes employed will be at least in part dependent upon the choice of fuel and oxidant and will be at least in part dependent upon whether the particular system employed contemplates passage of cations or anions through the respective membranes, according to ion-exchange principles well known in the art. However, in order to illustrate the invention, fuel cells will be described with more particularity hereinafter using oxygen or air as the oxidant, hydrogen as the fuel and anion-exchange membranes as membranes 10 and 10a.

FIGURE 2 illustrates schematically the use of the fuel cell described in FIGURE 1. As shown in FIGURE 2, a source of oxidant, i.e. oxygen, 14, and a source of fuel, i.e. hydrogen 15, are provided near oxidant electrode 11 and fuel electrode 12 respectively. Sources 14 and 15 may be a tank or any other suitable receptacle or vehicle containing the oxidant and fuel. It is contemplated that in commercial usage a plurality of fuel cells of the character described will be used in side-by-side relationship to provide the requisite amount of electricity. To separate electrode 11 of one fuel cell from electrode 12 of another cell in such systems utilizing a plurality of cells, spacer members 16 and 16a are preferably, but not necessarily, provided on the exterior sides of electrodes 11 and 12. These spacer members are at least permeable to the gases used in the system.

In operation, oxygen from oxidant source 14 and hydrogen from fuel source 15 are released by suitable release means (not shown) and the respective gases pass, in the manner indicated by the arrows, through spacer members 16 and 16a to oxidant electrode 11 and fuel electrode 12 respectively.

Membranes 10 and 10a are anion-exchange membranes selected primarily for their conductivity. Electrolyte 13 comprises an aqueous alkaline solution such as, for example, an aqueous solution of potassium hydroxide.

At fuel electrode 12, hydrogen reacts with the hydroxyl ions passing through membrane 10a according to the following general equation:

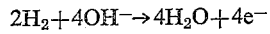

The electrons liberated by the reaction pass through electrode 12 to lead 19, resistor 20, and thence via lead 21 to electrode 11.

At electrode 11, oxygen reacts with water seeping through membrane 10 in the presence of the electrons entering through lead 21 according to the following general equation:

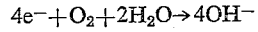

The hydroxyl ions formed by the above reaction pass through membrane 10 to electrolyte 13, thereby completing the circuit and supplying the desired electrical energy. From the foregoing equations it will be apparent that hydrogen is consumed twice as fast as is the oxygen and therefore should be supplied to the fuel cell at substantially twice the rate of flow as is the oxygen.

Since water is formed at fuel electrode 12, the cell is preferably provided with means to remove the water of reaction. As illustrated in FIGURE 2, means are provided at the bottom of electrode 12 for removal of this water, comprising a conduit 22 associated with valve 23. When valve 23 is open, water may be recovered from pipe 22 as potable drinking water. It will be appreciated that conduit 22 may also empty into a suitable water storage receptacle (not shown). Since the evolution of heat occurs at electrode 12 during the reaction whereby water is obtained and electrons liberated, the fuel cell is preferably provided with cooling means to prevent drying of the membrane 10a due to this heat. As shown, electrode 12 may also be provided with conduit means 24 and valve 25 whereby hydrogen gas and any entrained water vapor are caused to circulate by suitable fan or suction means (not shown) through heat exchanger 26 where the hydrogen is cooled and returned to source 15 via conduit 29 and the water is condensed and collected in receptacle 28 by means of conduit 27. Receptacle 28, which acts as a reservoir, is provided with conduits 30 and 32 provided with valves 31 and 33 respectively. Conduit 30 leads to electrolyte container 13 so that by opening valve 31, water from receptacle 28 is permitted to flow into container 13 to adjust the water content therein. It will be appreciated that container 13 may be provided with float means and/or pH measuring means which will automatically open and close valve 31 to provide any needed amount of water. Where desired, water may be recovered from receptacle 28 as potable drinking water by opening valve 33.

In the system illustrated above, oxygen was used as the oxidant. In the preferred embodiment, however, ambient air is used as the oxidant. The advantages resulting from the use of air are apparent. Not only is air a readily available source of oxygen, but also systems using air in lieu of oxygen are considerably lighter since they avoid the necessity of providing the oxygen tanks which weigh about eight times as much as tanks containing a similar volume of hydrogen. While fuel cells using air, such as hydrogen-air systems, have heretofore been particularly troubled by drying of the membrane, the present invention obviates this difficulty. As will be appreciated, in air systems, the gases not actually utilized in the systems, i.e., nitrogen and inert gases, must be blown away or the electrode otherwise vented to permit escape of these exhaust gases. In single membrane systems, these vented gases inherently entrain a certain amount of moisture from the membrane surface adjacent to the electrode, thereby reducing he moisture content of the membrane and raising the resistance, and eventually drying out the membranes to the point where they are irreparably damaged. In the duel membrane cell of the present invention, the presence of water in container 13 prevents the drying out of the membranes, thus avoiding the problem resulting from the use of air systems. Water passes through the membrane by capillarity and the water passing through and evaporating in the air-system serves further to cool the system, thereby serving the additional purpose of preventing undue rises in temperature and the consequent further tendency of the membranes to dry out due to the rises in temperature.

Where air is provided as the oxidant, source 14 may be dispensed with and a fan or other suitable means may be employed to blow ambient air against spacer 16 from whence it passes to electrode 11. At electrode 11 the oxygen in the air is utilized in the manner heretofore described, while the nitrogen, inert gases, etc., and water vapor entrained therein are vented through conduit 17 by means of valve 18. It will be appreciated that in systems using air, valve 18 is maintained in an open position, while in other systems such as the oxygen system previously described, valve 18 is closed or, alternatively, conduit 17 and associated valve 18 may obviously be eliminated altogether. Where the fuel cells are utilized in areas where it is necessary to maintain the balance of oxygen in the air, i.e. in closed or relatively confined areas, it will be appreciated that conduit 17 may be arranged to discharge into a suitable closed receptacle or receptacles which can be emptied at some future time. Likewise, it will be appreciated that the water vapor may be condensed and collected. If desired, the water vapor may be condensed and channeled by appropriate conduits to reservoir or storage receptacle 28 in a manner similar to the recovery of water from fuel electrode 12.

Electrodes 11 and 12 may be of known construction and materials and may for example be similar to analgous electrodes utilized in the fuel cells heretofore known in the art. Oxidant electrode 11 may, for example be a cathode made of a porous conductor without catalytic activity, such as porous carbon (e.g. graphite). Porous carbon without the catalyst is suitable for use in applications where relatively low current densities are desired. Preferably, however, the oxidant electrode comprises a porous structure activated with a metal oxide of catalytic activity for the conversion of oxygen-containing gas to hydroxyl ions, e.g. oxides of silver, gold, iron, magnesium, cobalt, copper, etc. Fuel electrode 12 may for example be a porous anode without catalytic activity, but also preferably comprises a porous conductor containing a suitable catalyst for the electrode reaction. For systems utilizing hydrogen or hydrogen-containing combustible gases, suitable catalysts include metals of Group VIII of the Periodic Table, such as rhodium, platinum, palladium, and iridium. Oxidant and fuel electrodes of the foregoing description are described with more particularity for example in copending application Serial No. 842,892, filed September 28, 1959, now Patent 3,124,520, in the name of Walter Juda. Other electrodes useful in the practice of this invention would be readily suggestive to those skilled in the art.

Ion-exchange membranes 10 and 10a may be the same or different and may be anion or cation exchange membranes or both. Thus, for example, both membranes 10 and 10a may be anion-exchange membranes, cation-exchange membranes or one may be an anion-exchange membrane and one a cation-exchange membrane. It is also within the scope of this invention for either or both membranes 10 and 10a to be a so-called "zebra" membrane, that is a membrane comprising alternate anion and cation exchange materials. The selection of the particular ion-exchange membranes employed will of course depend upon the chemical reaction upon which electrical energy is obtained, that is, it will depend upon the particular selectivity for passage of ions desired. Such ion-exchange membranes are known in the art and per se do not comprise any part of the present invention. Accordingly, while anion-exchange membranes have been utilized in the system illustrated in FIGURES 1 and 2, it is to be expressly understood that the invention is not restricted to the use of anion-exchange membranes. As examples of suitable anion-exchange membranes, mention may be made of membranes composed of a copolymer of styrene and divinyl benzene such as disclosed in U.S. Patent No. 2,780,604, and cation membranes of a copolymer of divinyl benzene and acrylic acid. As an example of other cation-exchange membranes, mention may be made of the styrene sulfonic acid type such as described in U.S. Patent No. 2,731,411. Other useful ion-exchange membranes are disclosed for example in U.S. Patents Nos. 2,636,851; 2,730,768; 2,731,408; 2,860,097; and 2,860,096; and application, Serial No. 118,282, filed June 22, 1961, in the name of Robert M. Lurie et al. The high solvent content membranes disclosed in the last mentioned application appear particularly promising in fuel cells since the greater solvent content would tend to lower the resistance as well as rendering the membranes less subject to damage due to dehydration.

The electrolyte solution may be either acidic or alkaline. Particularly good results have been obtained with an alkaline solution such as, for example, a 30% potassium hydroxide solution.

The spacer member may be any porous material permeable to and permitting passage of the oxidant and fuel from the sources to the oxidant and fuel electrodes respectively. As an example of materials which may be used as spacer members 16 and 16a, mention may be made of expanded titanium metal grid coated with platinum. Other materials which may be employed are well known in the art.

It will be appreciated that the relative sizes and dimensions of the component parts of the fuel cell shown in the drawing are greatly exaggerated for purposes of illustrating the invention. Thus, the membranes are generally relatively thin and may for example be about 0.030 inch thick and only about ½ inch apart, i.e. separated by an electrolyte solution ½ inch wide.

The following example shows by way of illustration and not by way of limitation the nature and operation of a fuel cell of this invention.

*Example 1*

A cell was constructed utilizing as electrodes 11 and 12 2" x 2" pieces of graphite cloth (National Carbon Company) on each of which 0.1 gram of platinum was deposited by chemical reduction of a platinic chloride solution. Membranes 10 and 10a were "ARIII" anion-exchange membranes (tradename for a resin containing strongly basic quaternary ammonium exchange groups, manufactured by Ionics, Incorporated). The electrolyte solution 13 was 1.4 inches thick and was 6 N KOH. Hydrogen and oxygen were fed to the electrodes such that the pressure was 3 cm. Hg at the electrode. The electrode spacers 16 and 16a were platinum coated titanium grid. Current was drawn from the cell through an ammeter and variable resistor. The cell voltage was also measured. A current of 0.5 amp. (20 ma./cm.$^2$) was steadily delivered at 0.5 volt. An open circuit voltage of 1.01 volts was measured.

From the foregoing description, it will be apparent that conventional or known materials may be used in the practice of the present invention, the essence of the invention being the novel arrangement of the component parts wherein a safe, durable and efficient fuel cell is provided. The essence of the invention therefore is the concept of providing a dual membrane fuel cell comprising an oxidant electrode and a fuel electrode, means associated with these electrodes which permit passage of ions to and from the electrodes to the substantial exclusion of passage of gas, and an electrolyte solution separating the two membranes and serving both to cool and moisten the ion permeable means and to permit ionic flow as well. As illustrated in the foregoing description of the invention, the ion permeable means associated with each electrode are ion-exchange membranes. However, it is within the scope of the invention to utilize equivalent means for permitting passage of ions. Accordingly, it is within the scope of this invention to replace either or both of membranes 10 and 10a with equivalent means such as for example a diaphragm which is permeable to the flow of ions, but is impermeable to and precludes the flow of gas.

What is claimed is:

1. A fuel cell of the character described comprising a pair of spaced porous electrodes; a first ion-permeable membrane on one side of one of said electrodes; a spaced second ion-permeable membrane on one side of the second of said electrodes, said ion-permeable membranes further characterized in that they substantially preclude passage of gas; and a solution of electrolyte between and in intimate contact with each of said ion-permeable membranes.

2. A fuel cell as defined in claim 1 including source means for providing oxidant associated with one of said electrodes and source means for providing a combustible fuel associated with the other of said electrodes.

3. A fuel cell as defined in claim 2 including spacer means in contact with at least one of said electrodes and the source means associated therewith, said spacer means being permeable to and permitting passage of gas from said source means to said electrode.

4. A fuel cell as defined in claim 2 wherein said oxidant source means contains an oxidant selected from the group consisting of oxygen and oxygen-containing gases and said fuel source contains a fuel selected from the group consisting of hydrogen and hydrogen-containing gases.

5. A fuel cell as defined in claim 1 wherein at least one of said ion-permeable membranes comprises an ion-exchange membrane.

6. A fuel cell as defined in claim 5 wherein both of said ion-permeable membranes and said electrolyte solution comprises an aqueous alkaline solution.

7. A fuel cell as defined in claim 1 including means associated with at least one of said electrodes for recovering potable drinking water.

8. A fuel cell as defined in claim 7 wherein said means for recovering water include heat exchange means for condensing said water and collecting means for recovering said condensed water.

9. A fuel cell as defined in claim 8 wherein said heat exchange means is provided with means for recirculating gas to one of said electrodes.

10. A fuel cell as defined in claim 8 wherein said collecting means are provided with means for passage of water from said collecting means to said electrolyte solution.

11. A fuel cell as defined in claim 10 wherein said passage means include means for automatically releasing a measured amount of said water when actuated by measuring means, whereby the water content of said electrolyte solution is maintained at a predetermined level.

12. A fuel cell comprising a porous cathode; means for introducing an oxidizing gas into said cathode; a first anion-exchange membrane in intimate contact with at least the inner side of said cathode; a porous anode; means for introducing into said anode a fuel gas selected from the group consisting of hydrogen and hydrogen-containing gases; a second anion-exchange membrane in intimate contact with at least the inner side of said anode; and an aqueous alkaline solution between and in intimate contact with each of said anion-exchange membranes.

13. A process for producing electrical energy from a combustible gas and an oxidizing gas which comprises continuously selectively passing hydroxyl ions from an electrolyte solution through a first ion-permeable membrane to a first electrode; reacting hydrogen with the hydroxyl ions at said electrode to form water and free electrons; conducting said electrons through a resistor to a second electrode; reacting oxygen with water from said electrolyte solution in the presence of said electrons at said second electrode to form hydroxyl ions; and continuously selectively passing the hydroxyl ions formed at said second electrode to said electrolyte solution, whereby to complete the electrical circuit and produce said electrical energy.

References Cited in the file of this patent

UNITED STATES PATENTS

| | | |
|---|---|---|
| 2,700,063 | Manecke | Jan. 18, 1955 |
| 2,913,511 | Grubb | Nov. 17, 1959 |

UNITED STATES PATENT OFFICE
CERTIFICATE OF CORRECTION

Patent No. 3,152,015                      October 6, 1964

Charles E. Tirrell

It is hereby certified that error appears in the above numbered patent requiring correction and that the said Letters Patent should read as corrected below.

Column 8, line 7, after "membranes" insert -- are anion exchange membranes --.

Signed and sealed this 24th day of August 1965.

(SEAL)
Attest:

ERNEST W. SWIDER                      EDWARD J. BRENNER
Attesting Officer                        Commissioner of Patents